United States Patent
Veltena

(10) Patent No.: US 8,996,179 B2
(45) Date of Patent: Mar. 31, 2015

(54) MOVEMENT SIMULATOR

(75) Inventor: Marinus C. Veltena, Hillegom (NL)

(73) Assignee: E2M Technologies B.V., Amsterdam (NL)

( * ) Notice: Subject to any disclaimer, the term of this patent is extended or adjusted under 35 U.S.C. 154(b) by 862 days.

(21) Appl. No.: 13/182,807

(22) Filed: Jul. 14, 2011

(65) Prior Publication Data

US 2012/0029703 A1 Feb. 2, 2012

(30) Foreign Application Priority Data

Jul. 29, 2010 (NL) .................................... 2005174

(51) Int. Cl.
*G05B 15/02* (2006.01)
*B25J 9/16* (2006.01)

(52) U.S. Cl.
CPC ..... *B25J 9/1615* (2013.01); *G05B 2219/50162* (2013.01)
USPC .......................................................... 700/275

(58) Field of Classification Search
CPC ............ G09B 9/12; G09B 9/00; G09B 19/16; G09B 9/04; G09B 9/02
USPC .......................................................... 700/60
See application file for complete search history.

(56) References Cited

U.S. PATENT DOCUMENTS

| | | | | |
|---|---|---|---|---|
| 5,623,878 A | * | 4/1997 | Baxter et al. | 104/85 |
| 5,752,834 A | * | 5/1998 | Ling | 434/58 |
| 2010/0279255 A1 | * | 11/2010 | Williams, II | 434/29 |

OTHER PUBLICATIONS

Nehaoua et al., Motion Cueing Algorithms for Small Driving Simulator, Proceedings of the 2006 IEEE International Conference on Robotics and Automation, Orlando, Florida—May 2006, p. 3189-3194.*
Search Report from the Dutch Patent Office on co-pending NL application (NL2005174) dated Mar. 21, 2011.
Hwang et al.; "Adaptive motion washout filter desing by using self-tuning fuzzy control"; Advanced Intelligent Mechatronics, 2009; IEEE/ASME International Conference on, IEEE, Piscataway, NJ, USA; Jul. 14, 2009; pp. 811-815; XP031524110.
Nehaoua et al.; "Design and control of a small-clearance driving simulator"; IEEE Transactions on Vehicular Technology; IEEE Service Center; Piscataway, NJ, USA; Mar. 1, 2008; pp. 736-746; XP011201791.

(Continued)

*Primary Examiner* — Mohammad Ali
*Assistant Examiner* — John Park
(74) *Attorney, Agent, or Firm* — Klein, O'Neill & Singh, LLP

(57) ABSTRACT

A movement simulator includes a base; a platform movable relative to the base; a plurality of actuators each having a controllably variable length, each of the actuators being coupled with the base and carrying the platform, wherein the dimensions of the base and the platform, and the variable lengths of the actuators determine a workspace within which the platform can move. A controller is operable to provide a motion cueing algorithm having a demanded platform state as output and a washout controller having a washout adaptation as output, which washout controller keeps the platform within its workspace by adapting the demanded platform state to a commanded platform state using the washout adaptation. The commanded platform state controls, via a kinematic transformation, the lengths of the actuators. The washout adaptation is calculated using a model predictive control algorithm.

20 Claims, 4 Drawing Sheets

(56) References Cited

OTHER PUBLICATIONS

Chang et al.; "Optimal motion cueing for 5-DOF motion simulations via a 3-DOF motion simulator"; Control Engineering Practice; Pergamon Press, Oxford, GB; Jan. 1, 2009; pp. 170-184; XP025535015.

Chen et al.; "Predictive washout filter design using the forward kinematics and a Kalman filter"; Intelligent Control; IEEE 22nd International Symposiu M ON, IEEE, PI; Oct. 1, 2007; pp. 420-425; XP031151850.

\* cited by examiner

MOVEMENT SIMULATOR

CROSS-REFERENCE TO RELATED APPLICATION

Not applicable.

FEDERALLY SPONSORED RESEARCH AND DEVELOPMENT

Not applicable.

BACKGROUND

This disclosure relates to a movement simulator, comprising a base; a platform movable relative to said base; actuators having a controllable length, said actuators being coupled with said base and carrying said platform, wherein the dimensions of the base, platform and the variable lengths of the actuators determine a workspace within which the platform can move; and a controller operable to provide a motion cueing algorithm having a demanded state as output and a washout controller having a washout adaptation as output, which washout controller keeps the platform within its workspace by adapting the demanded state to a commanded state using the washout adaptation, wherein the commanded state controls the length of the actuators.

An example of such an apparatus that is most commonly used for movement simulators is the so-called Stewart platform which comprises a fixed base, moving platform and 6 actuators. An example of such a Stuart Platform is described in EP-A-446786. A Stewart Platform is a kind of parallel manipulator using an octahedral assembly of struts. A Stewart platform has six degrees of freedom (x, y, z, pitch, roll, & yaw), also referred to as the platform domain coordinates. There are six independently actuated elements or legs, where the lengths of the legs are changed to position and orient the platform. The status of the platform can also be expressed by the actual length of the legs. This is referred to as the so-called actuator domain and is different from the platform domain coordinates.

Many movement simulators have been developed for many different types of vehicles. In order to make a simulation more realistic, linear accelerations and angular rates are exerted on the user by moving the platform. This activity is also referred to as motion cueing. The movement of the simulator is controlled by a so-called motion cueing algorithm. These platform movements however should not drive the simulator out of its workspace. The software component that is in charge of keeping the simulator platform within its workspace is commonly referred to as a washout filter. The washout filter aims to bring the platform back into a substantially central position whereby the forces exerted on the user are minimal. Thus the user preferably does not experience the lower-frequency washout movement of the platform to its central position as opposed to the high frequency movements caused by the motion cueing algorithm.

US-A-2009/0047636 describes a method for controlling the movements of a flight simulator, wherein a 2nd order high pass filter and a conventional 1st order washout filter are used. Such a washout filter will act irrespective of the actual position of the platform. This results in that the washout filter will also act when the platform itself is not far away from its central position and therefore no washout action is actually required.

SUMMARY

The present invention aims at providing a movement-simulator which has a more optimal washout filter.

This aim is achieved by the following movement simulator, comprising a base; a platform movable relative to said base; actuators having a controllable length, said actuators being coupled with said base and carrying said platform, wherein the dimensions of the base, platform and the variable lengths of the actuators determine a workspace within which the platform can move; and a controller operable to provide a motion cueing algorithm having a demanded platform state as output and a washout controller having a washout adaptation as output, which washout controller keeps the platform within its workspace by adapting the demanded platform state to a commanded platform state using the washout adaptation, wherein the commanded platform state controls, via a kinematic transformation, the length of the actuators and wherein the washout adaptation is calculated using a model predictive control algorithm comprising a cost-minimizing control strategy for position, velocity and washout acceleration of the platform and wherein the model predictive control algorithm continuously uses the demanded platform state and current washout adaptation as inputs to compute a predicted platform state at t+Δt, subsequently the algorithm quantifies the first and second order gradient of the costs J, wherein a new value for the optimal washout adaptation is obtained which results in minimal total costs, and wherein the washout adaptation is used to continuously modify the demanded platform state to a commanded platform state for a next computational step t+dt, wherein dt is smaller than Δt.

The disclosure is also directed to a method to operate a movement simulator comprising a base, a platform movable relative to said base, actuators having a controllable length, said actuators being coupled with said base and carrying said platform, and wherein the dimensions of the base, platform and the variable lengths of the actuators determine a workspace within which the platform can move, wherein a motion cueing algorithm provides a demanded platform state as output, wherein a washout controller keeps the platform within its workspace by adapting the demanded platform state to a commanded platform state using a washout adaptation, which washout adaptation is calculated using a model predictive control algorithm adaptation, and wherein the lengths of the actuators are controlled by the commanded platform state via a kinematic transformation.

By using a model predictive control algorithm an adaptive 2nd order washout filter results, which is controlled by the size of the workspace and the platform position relative to the boundaries of said workspace. This results in that the movement-simulator according to the disclosure and its method of operation makes much better use of its available workspace than the prior art movement simulator having a prior art washout filter.

BRIEF DESCRIPTION OF THE DRAWINGS

The preferred embodiments will be further illustrated making use of the following figures.

DETAILED DESCRIPTION

The movement simulator may be any system having from 1 to and including 6 degrees of freedom, wherein the degrees of freedom (DOF) can be any of x, y, z, pitch, roll & yaw. A preferred movement simulator has 6 degrees of freedom. The description will illustrate a movement-simulator having 6 degrees of freedom. A skilled person can easily understand how this disclosure will work for a movement simulator having fewer degrees of freedom based on said description.

Figure 1:
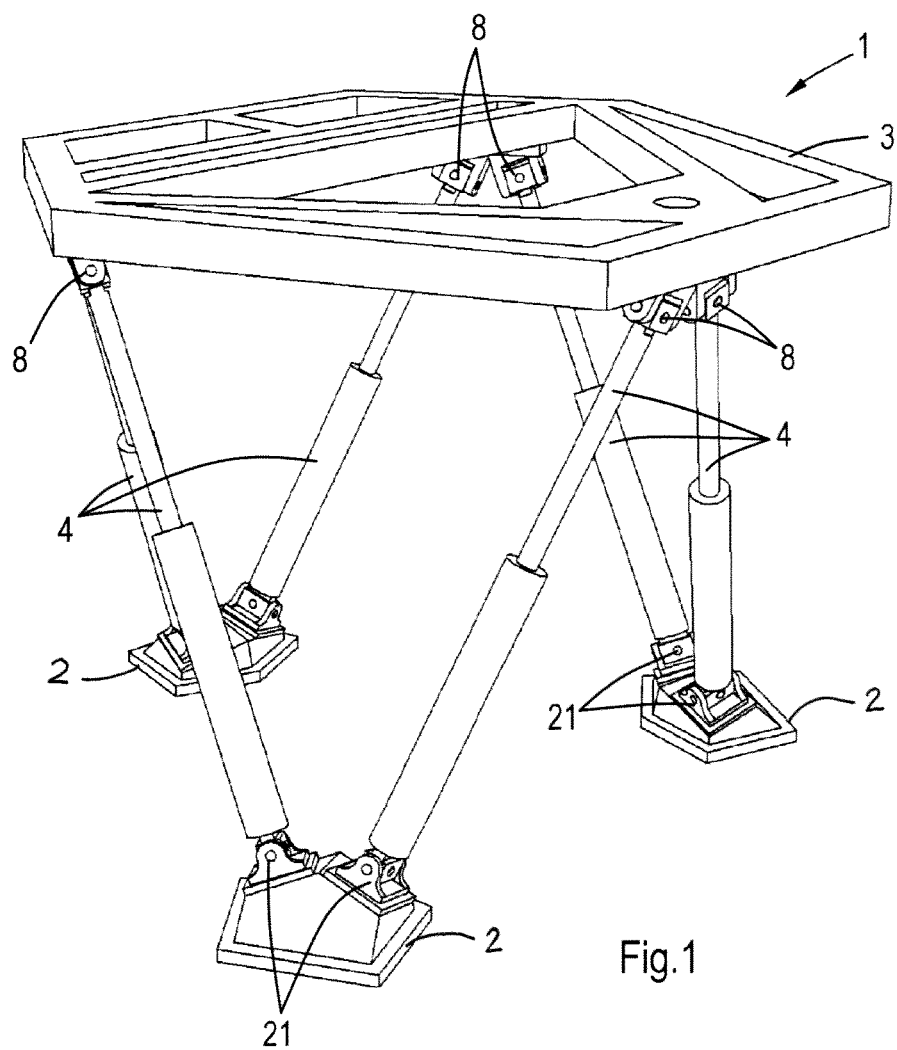
FIG. 1 illustrates a movement simulator having a base, a platform movable relative to said base, and 6 actuators having a controllable length.

FIG. 1 illustrates an example of a movement simulator 1 having 6 degrees of freedom. The illustrated movement simulator is also referred to as Stewart Platform or six-axis platform. Stewart Platforms are well known and for example described in the afore mentioned EP-A-446786 or US-A-2009/0047636. The movement simulator of FIG. 1 comprises a base 2 placed on the floor, and a platform 3 movable relative to that base 2, on which platform e.g. a cockpit (not shown) with a seat for a user may be fixed. The base may be a single frame or separate elements individually fixed to the floor. The cockpit may be for example an airplane cockpit, a helicopter cockpit, a space shuttle cockpit, a (race) automobile cockpit, or a cockpit for a train, metro, or tram. The cockpit may be used for recreation or for professional training applications. The platform 3 is movably carried by the base 3 by means of six hydraulic cylinders, which all for the sake of convenience are referred to with the numeral 4. These hydraulic cylinders are connected with a non-shown central controller and a hydraulic system. The lengths of the hydraulic cylinders can be varied at will by the central controller which is not shown in FIG. 1. The actuators shown in FIG. 1 are hydraulic cylinders. Alternatively the actuators may be electric actuators, pneumatic cylinders or any other actuators which length can be varied.

Figure 2:
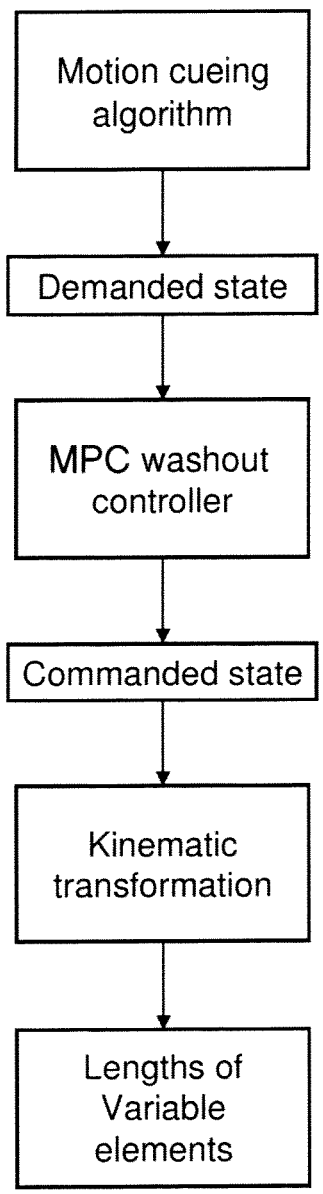
FIG. 2 is a block diagram illustrating how the demanded platform state is adapted to a commanded platform state by the method according to the disclosure.

FIG. 2 is a block diagram illustrating how the demanded platform state is adapted to a commanded platform state by the method and simulator according to the invention. The motion cueing algorithm receives input from a computer program which describes the simulation, for example a aircraft flight simulation program. Motion cueing algorithms are well known. The above referred to US-A-2009/0047636 discloses an example of a possible motion cueing algorithm which can be used. The demanded platform state comprises of a demanded acceleration, demanded velocity and demanded position for the platform 3. The demanded acceleration, velocity and position are subsequently adapted by a washout controller resulting in a commanded platform state. In the kinematic transformation the commanded platform state as expressed in commanded acceleration, velocity and position are translated to an actuator state. In the kinematic transformation the actual required lengths of actuators are calculated to achieve the commanded platform state. By instructing the actuators to vary their lengths platform 3 will move according to the commanded platform state.

FIG. 2 shows an MPC washout filter which stands for washout filter using a model predictive control algorithm (MPC). MPC is a well known method of process control that has been in use in the process industries such as chemical plants and oil refineries since the 1980s. MPC is based on iterative, finite horizon optimization of a model of the apparatus to be controlled. The apparatus of the present disclosure is the movement simulator. The model predictive control algorithm samples at time t the current platform platform state and subsequently computes a cost minimizing control strategy (via a numerical minimization algorithm) for a relatively short time horizon in the future t+Δt. Specifically, an online or on-the-fly calculation is used to predict the state of the platform that emanates from the current commanded platform state, and to find a cost-minimizing control strategy until time t+Δt. Only the first computational step (after time period dt) of the control strategy is implemented to the commanded platform state. Then the platform state is sampled again and the calculations are repeated starting from the now current platform state, yielding a new commanded platform state and new predicted platform state path. The prediction horizon keeps being shifted forward, and for this reason the term "receding horizon control" is also used to describe this method of process control.

The above referred to platform state is expressed in the platform domain position coordinates. The number of different platform domain position coordinates used will preferably be the same as the number of degrees of freedom of the movement simulator itself.

The demanded and commanded platform states are preferably expressed in terms of position, velocity and acceleration. Using the same coordinates, relative platform position can be expressed with respect to the positive or negative workspace boundaries or with respect to the workspace center.

Preferably the model predictive control algorithm comprises a cost-minimizing control strategy for relative platform position, platform velocity and platform washout acceleration. More preferably the model predictive control algorithm continuously uses the demanded platform state and current washout adaptation as inputs to compute a commanded platform state. The commanded platform state is then used to predict a platform state at t+Δt (the predicted platform state); subsequently the algorithm quantifies the first and second order gradient of the costs J. In this manner an optimal washout adaptation is obtained which results in minimal total costs. The term "minimal total costs" does not relate to money. It is a term often used in MPC to describe the difference between the optimal platform state and the best achievable platform state at t+Δt. The washout adaptation is used to continuously modify the demanded platform state to a commanded platform state for a next computational step t+dt, wherein dt is smaller than Δt. For a typical 1.5 GHz computer Δt can for example be 0.5 seconds and dt can for example be 2 milliseconds.

Figure 3:
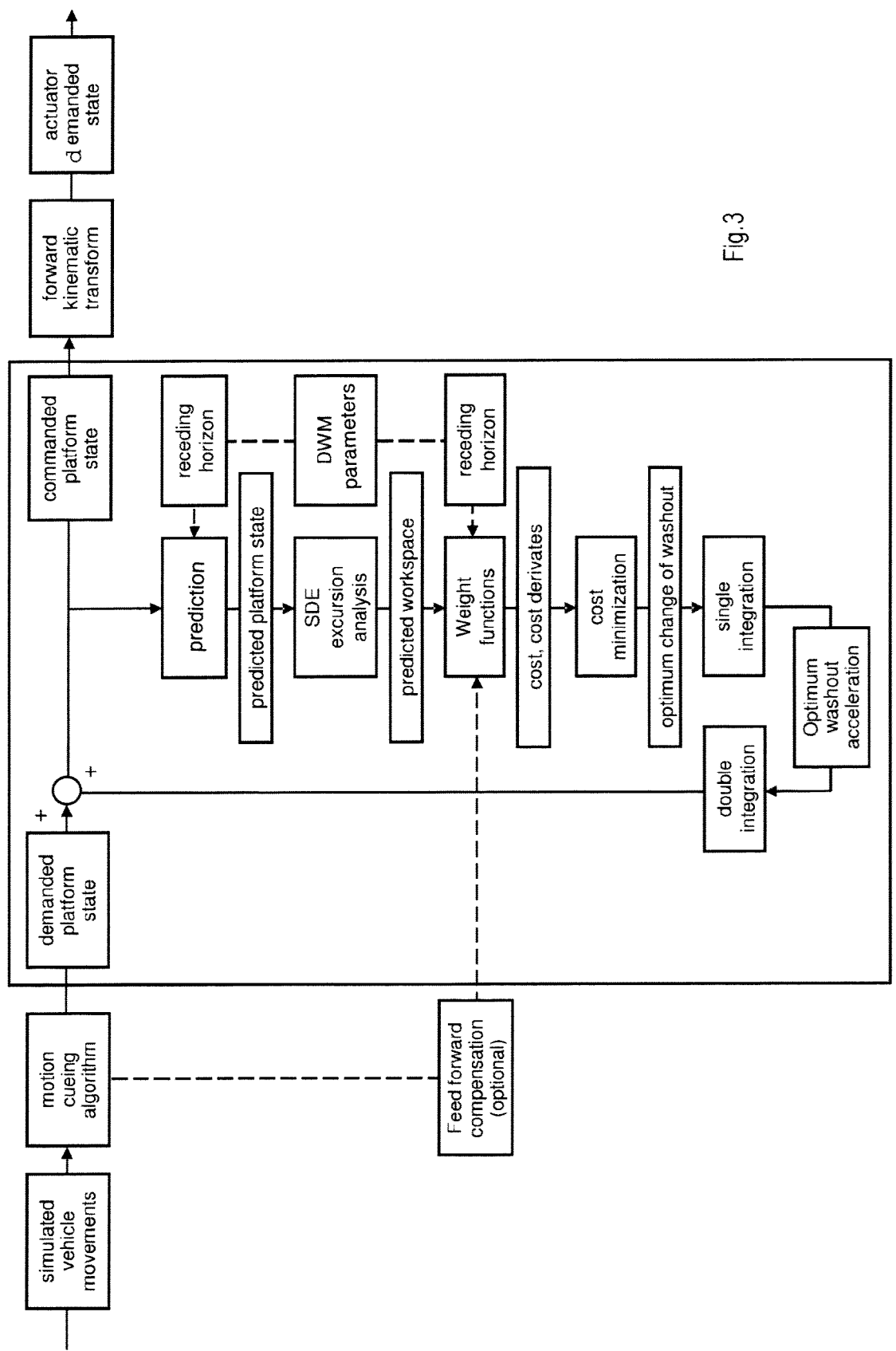
FIG. 3 is a block diagram of details of the model predicted control algorithm.

The above is illustrated by the block diagram given in FIG. 3. FIG. 3 shows a block diagram of the washout controller in more detail. The washout controller is part of the central controller. FIG. 3 shows how the predicted platform state at t+Δt is calculated starting from a demanded state and a current platform washout adaptation. Δt is a adjustable parameter shown as one of the DWM parameters. The predicted platform state forms the input for a so-called Single DOF Excursion analysis (SDE analysis) for the predicted position, which will be described in detail below. The SDE analysis predicts a workspace for the predicted platform state. The costs derivatives are the first and second order gradient of the costs J with washout acceleration. The predicted platform state in the workspace and preferred adjustable weight factors will influence the calculated first and second order gradient of the costs J. Using so-called weight functions which use weight factors and use the predicted workspace as inputs, the first and second order gradient of the costs J are subsequently calculated. Using weight functions is advantageous because they allow the weight to be a function of, for example, position, where higher weight and thus costs result when the platform state is near the workspace boundary and lower weight and thus cost result when the platform is near its central position. The weight factors will have adjustable constants which are shown as one of the DWM parameters in FIG. 3.

The weight function can also be made time dependant, shown as the optional feed forward in FIG. 3. For example when the motion cueing predicts an extreme movement, as, for example, the start of a Formula One race, weight factors can be temporarily adjusted resulting in that the platform is brought into a position that allows the prolonged acceleration of said Formula One start.

The optimal change in washout is obtained at minimal costs. By means of a single integration optimum washout acceleration is obtained. By means of a double integration the optimal washout adaptation at minimal total costs is obtained. In state integration at dt only the first computational step (after time period dt) of the control strategy is implemented as the washout adaptation to the commanded platform state.

The washout adaptation is the integration of washout acceleration which is preferably calculated by the following equation:

$$\dot{\vec{a}}_{wo} \approx \frac{\Delta \vec{a}_{wo}}{\Delta t} = \frac{K}{\Delta t}\left(\frac{\partial^2 J}{\partial \vec{a}_{wo}^2}\right)^{-1}\frac{\partial J}{\partial \vec{a}_{wo}} \quad (1)$$

wherein $\vec{a}_{WO}$ is the washout acceleration, $\dot{\vec{a}}_{WO}$ is the optimum rate of change of the washout acceleration and J is the total costs. J is a summation of Jp, Jv and Ja, wherein Jp is position cost, Jv is velocity cost and Ja is acceleration cost. Suitably J is the summation of Jp which is derived from the relative position in the workspace, Jv which is derived from the velocity through the workspace and Ja which is derived from the washout acceleration through the workspace.

K is a constant which will, in an ideal mathematical situation, be equal to −1. Applicants believe that K may vary while still achieving the benefits of the present invention.

Jp is the result of multiplying the predicted position relative to the workspace center with a position weight function which uses the position relative to the workspace center and the position relative to a positive and negative workspace boundary as inputs.

Jv is the result of multiplying the predicted velocity with a velocity weight function which uses the position relative to the workspace center and the position relative to a positive and negative workspace boundary as inputs.

Ja is the result of multiplying the predicted washout acceleration with an acceleration weight function. The weight function may be a constant or alternatively be a function which uses the position relative to the workspace center and the position relative to a positive and negative workspace boundary as inputs. The objective of using non-constant position dependent weight functions is to implement adaptive dynamic behavior of the washout optimization for various areas of the workspace. Other different, but mathematically equivalent, methods exist. For example, the same effect is achieved by choosing constant weight functions and non-constant scaling functions for normalized position, velocity and acceleration coordinates.

Since the platform can move in 6 degrees of freedom, the MPC control problem is multi-variable and therefore all cost functions Jp, Jv and Ja contain the contributions of each degree of freedom.

The acceleration cost Ja depends on the difference between demanded and commanded platform acceleration. In this respect the demanded platform acceleration is the acceleration as computed by the motion cueing algorithm. The commanded acceleration refers to the platform acceleration as computed by the washout controller. For example, the value of the acceleration cost function is minimal when the commanded acceleration closely follows the demanded acceleration. In motion cueing terms: the demanded acceleration represents the acceleration cue where the difference between demanded and commanded acceleration represents the washout.

For each predicted value of platform position, the washout optimization, and more specifically, the cost function J requires computation of the workspace boundaries and center. Additionally the first and second order derivatives of J require computation of the first and second order derivative of the predicted workspace boundaries and center for variations of the washout acceleration. The used algorithm preferably integrates a method for efficiently computing these quantities as will be described below.

The workspace position coordinate $\vec{e}$ is expressed in platform domain coordinates x, y, z, pitch, roll, & yaw according to the following formula:

$$\vec{e} = (x\ y\ z\ \phi\ \theta\ \psi)^T = e_i \quad (2)$$

wherein x, y and z are the position coordinates for platform translation and $\phi$, $\theta$ and $\psi$ are the platform angular position in pitch, roll & yaw. An index $e_i$ is added as a subscript to indicate the DOF of the coordinate system, i.e., $e_i$ is the excursion value for the i-th DOF, wherein for 6 degrees of freedom (DOF) i runs from 1 to 6 for x, y, z, pitch, roll, & yaw respectively. Likewise $e_i^+$ and $e_i^-$ are the positive and negative excursion limits for the i-th DOF, where $e_i^c$ is the center excursion for the i-th degree of freedom.

Coordinates $\vec{e}$ representing combinations of degrees of freedom, i.e. the possible platform position coordinates x, y, z, $\phi$, $\theta$ and $\psi$, that can be realized by the platform 3, are mapped within the workspace. When a coordinate is mapped outside of the workspace, one or more of the actuators 4 are either too long or too short. The outside surface of the workspace is continuous but not completely smooth. It is characterized by adjacent patches. On each of these patches a single combination of one or multiple actuators 4 are at their excursion limit. The surface of each patch is continuous and smooth; however, when moving from one patch to another, a different set of actuators 4 becomes the limiting factor and a discontinuous transition occurs in the gradient of the surface. At some places the transition between two adjacent workspace surface areas will be relatively smooth. At other places sharp edges are present.

Figure 4:
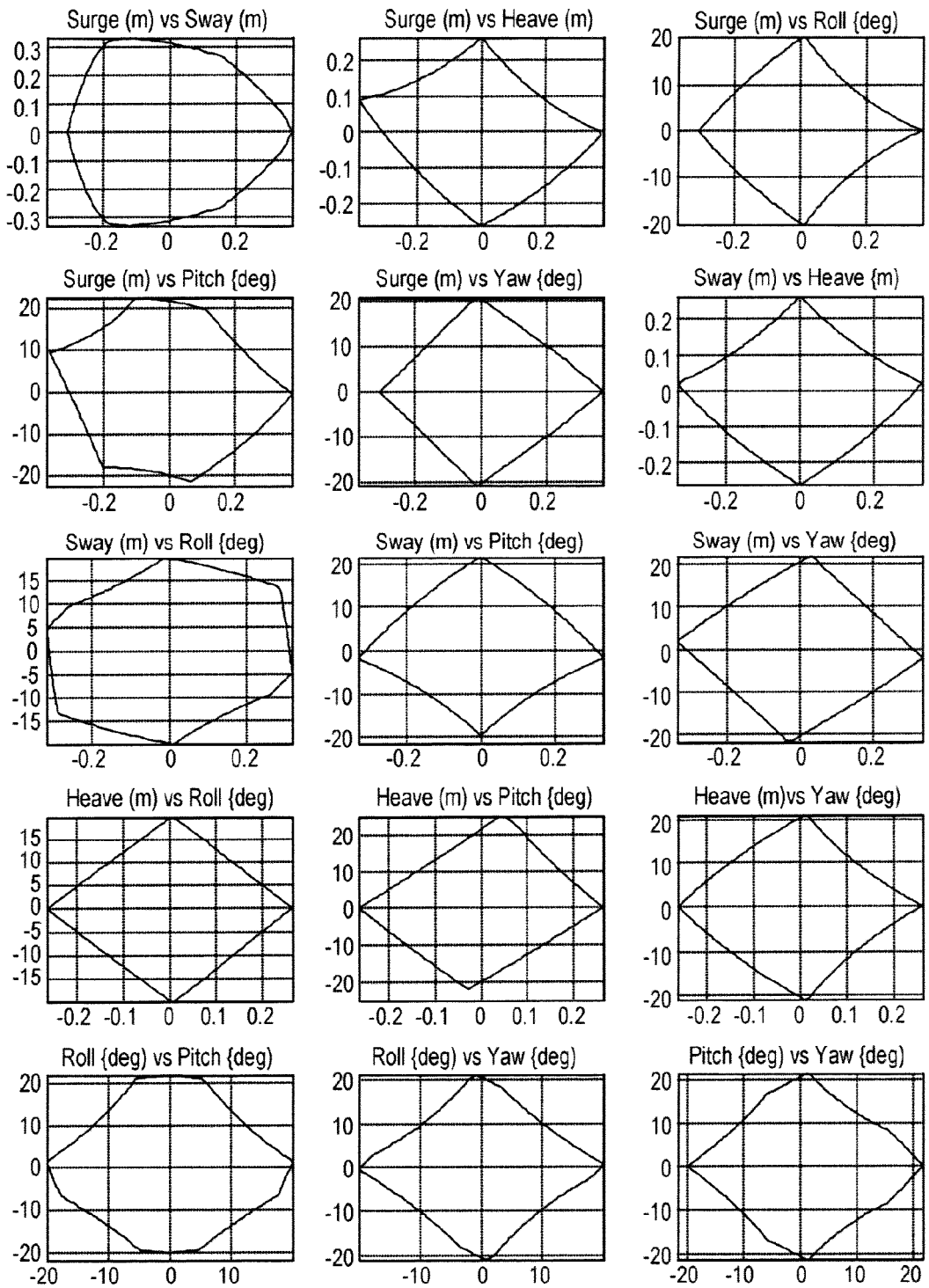
FIG. 4 shows cross-sectional plots of a platform workspace that is formed when 4 of the 6 degrees of freedom are fixed.

The above is illustrated in FIG. 4, which shows images of two degrees of freedom workspaces that are formed when 4 of the 6 degrees of freedom are fixed. No combinations of the 2 "free" degrees of freedom exist which can bring the platform to a position outside these lines. This is because that would require that one or both of the actuators 4 would have a length which is higher or lower than the possible variation of the length of the actuator 4.

Figure 5:
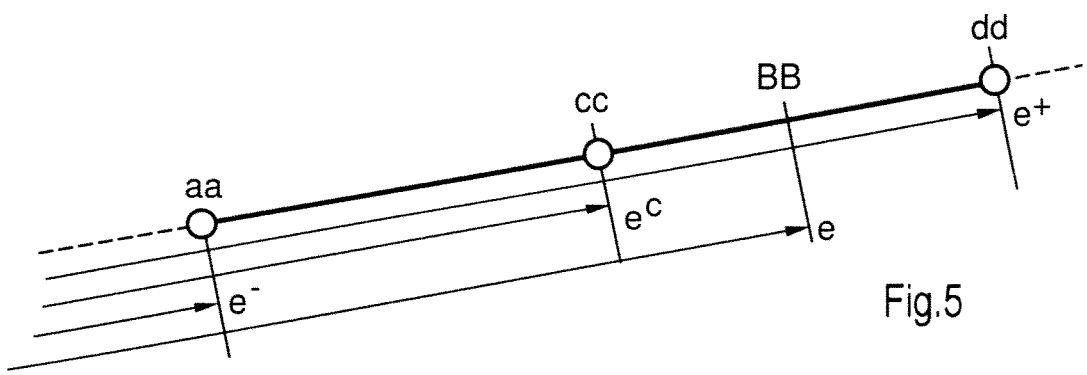
FIG. 5 shows a single Degree of Freedom (DOF) excursion wherein 5 of the 6 degrees of freedom are fixed and only one degree of freedom remains.

The single DOF excursion analysis is illustrated in FIG. 5. FIG. 5 shows an image of a single DOF excursion (SDE) workspace that is formed when 5 of the 6 degrees of freedom are fixed and only one degree of freedom remains. The resulting SDE workspace is represented by a line with boundaries $e^-$ and $e^+$. All values of the remaining degree of freedom that can be realized are mapped on this line segment. Excursions that require one or more actuators 4 to be either too long or too short are mapped outside of the indicated boundaries. The coordinate value at the center of the workspace is specified by the coordinate $e^c$ which is given by:

$$e^c = \frac{(e^+ + e^-)}{2} \quad (3)$$

For any given platform state within the workspace, the minimum, maximum and center coordinate values of the SDE workspace for any degree of freedom are determined by the values of the other degrees of freedom which are assumed to be fixed. In practical cases where a platform is moving through its workspace, the minimum, maximum and center values of the SDE workspaces will constantly change.

Preferably, for any given platform position within the workspace $\vec{e}$, the SDE workspaces are sequentially computed for each degree of freedom using an SDE analysis which allows the platform only to move in the analyzed free degree of freedom while keeping the remaining 5 degrees of freedom fixed at their value $e_i$.

This results in the values for $e_i^+$, $e_i^-$ and $e_i^c$.

For the SDE analysis, an iterative method can be used where the platform is moved stepwise along its free degree of freedom until a position is found where one or more actuators is either fully extended or fully retracted. Each step requires a Forward Kinematics analysis in which actuators' lengths are computed for a defined platform position. Preferably use is made of the Jacobian matrix which expresses the partial derivatives of actuator length for displacements of the platform along its degree of freedom for the current position of the estimator in the workspace. By using a Jacobian matrix, a relatively fast iteration is possible which will nevertheless require between 3-4 steps to converge with sufficient accuracy.

The more preferred method for SDE analysis makes use of two persistent SDE estimators for each degree of freedom, one estimating the minimum excursion and one estimating the maximum excursion, and each having its own Jacobian matrix. While the motion system is moving through its workspace, the fixed degrees of freedom of the SDE estimators need to be aligned with the predicted position of the motion system at the fixed time horizon $\Delta t$. At each cycle of the algorithm, each estimator copies the values of the fixed degrees of freedom from current predicted position $e_i$ which leads to a new position of the estimator, possible slightly away from the workspace boundary. A Forward Kinematics analysis is then used to update the Jacobian matrix for the new position and to adjust the free degree of freedom such that the estimator is repositioned accurately on the workspace boundary. This leads to 12 platform extreme positions, 2 per degree of freedom (either $e^+$ or $e^-$) in just one iteration step per degree of freedom. Subsequently, the center of the workspace is computed using equation (3).

The SDE workspace acceleration derivatives are defined as the partial derivatives of the SDE workspaces maximum, minimum and center values for variations of the platform acceleration applied during the finite time horizon $\Delta t$. They are noted as $\partial e_i^+/\partial a_j$, $\partial e_i^-/\partial a_j$ and $\partial e_i^c/\partial a_j$ in which index i defines the degree of freedom of the SDE workspace, and index j defines the degree of freedom of the acceleration perturbation.

Likewise, the SDE workspace position derivatives are defined as the partial derivatives of the SDE workspaces maximum, minimum and center values for variations of the predicted platform position due to variations of the platform acceleration during the finite time horizon $\Delta t$. They are notated as $\partial e_i^+/\partial a_j$, $\partial e_i^-/\partial a_j$ and $\partial e_i^c/\partial a_j$ in which index i defines the degree of freedom of the SDE workspace, and index j defines the degree of freedom of the position perturbation. The SDE workspace acceleration derivatives can be computed from the SDE workspace position derivatives using:

$$\frac{\partial e_i^-}{\partial a_j} = \frac{\partial e_i^-}{\partial e_j}\frac{\partial e_j}{\partial a_j} = \frac{\partial e_i^-}{\partial e_j}\frac{\Delta t^2}{2} \quad (4)$$

$$\frac{\partial e_i^+}{\partial a_j} = \frac{\partial e_i^+}{\partial e_j}\frac{\partial e_j}{\partial a_j} = \frac{\partial e_i^+}{\partial e_j}\frac{\Delta t^2}{2}$$

$$\frac{\partial e_i^c}{\partial a_j} = \frac{\Delta t^2}{4}\left(\frac{\partial e_i^+}{\partial e_j} + \frac{\partial e_i^-}{\partial e_j}\right)$$

wherein the partial derivative $\partial e_j/\partial a_j$ represents the partial derivative of the predicted platform position for the j-th degree with platform acceleration in the same degree of freedom. Taking into account that the a constant acceleration perturbation is applied during a finite time horizon of $\Delta t$, its value is constant and equals $\Delta t^2/2$.

Computation of the cost derivatives in equation (1) requires computation of the SDE workspace acceleration derivatives which are in turn computed from the SDE workspace position derivatives using equation (4).

Theoretically, the SDE workspace position derivatives can be obtained numerically by numerical differentiation of the SDE analysis for the current predicted platform position. This, however, required 120 SDE analyses per time step dt which is generally too much to be done in real-time.

The preferred method for computation of the SDE workspace position derivatives is to proceed from a linear analysis given by of equation:

$$Jc\Delta e_i + Jc\Delta e_j = \vec{0} \quad (5)$$

which expresses how much excursion $\Delta e_i$ in direction of the SDE workspace free degree of freedom (index i) is required to get back on the workspace extreme when a position perturbation of $\Delta e_j$ is applied, wherein Jc is the Jacobian matrix for the considered SDE workspace extreme position and j identifies the degree of freedom of the position perturbation.

FIG. 4 shows that that the derivatives of the single DOF workspace limits can be expected sometimes to vary in a discontinuous manner when the platform moves through its workspace. When these discontinuities happen, the critical actuator 4 that determines the workspace limit jumps discretely from one actuator 4 to another. The problem is that these large discontinuous changes of the SDE workspace position derivatives may cause oscillations or discontinuities in the washout adaptation. To avoid these effects applicants have found a solution wherein preferably mathematically the edges of the workspace, at places where the limiting actuator changes index, are smoothed off, also referred to as an "edge blending solution." Preferably a tuneable edge blending distance is as small as possible. A too large edge blending distance will limit the available workspace, while a too small distance will not avoid the non-desirable oscillation. A skilled person may by trial and error determine the optimal edge blending distance. An example of a typical value for a typical platform is 10 mm. This edge blending solution thus allows actuators 4 that are not yet critical to influence the outcome of the washout controller according to the invention.

Using the edge blending technique, the SDE workspace derivatives for $e_i^+$ and $e_i^-$ are give by:

$$i = j \Rightarrow \frac{\partial e_i^-}{\partial e_j} = \frac{\partial e_i^-}{\partial e_j} = 0 \tag{6}$$

$$i \neq j \Rightarrow \frac{\partial e_i^-}{\partial e_j} = \frac{-\sum_{k=1}^{6} W_k \frac{Jc(k,j)}{Jc(k,i)}}{\sum_{k=1}^{6} W_k}$$

$$\frac{\partial e_i^-}{\partial e_j} = \frac{-\sum_{k=1}^{6} W_k \frac{Jc(k,j)}{Jc(k,i)}}{\sum_{k=1}^{6} W_k}$$

wherein $W_k$ is the edge blending function which is a function of available free travel of the k-th actuator 4 to its critical excursion limit. Generally a function is chosen in which $W_k$ is zero when the available travel is larger than the edge blending distance and then linearly approaches a value of 1 when the available length is zero. Edge blending is cancelled when $W_k=1$ for critical actuators and when $W_k=0$ for non-critical actuators.

The position derivative of the SDE workspace center is the average of the derivative for the positive and negative SDE workspace limits:

$$\frac{\partial e_i^c}{\partial e_j} = \frac{1}{2}\left(\frac{\partial e_i^-}{\partial e_j} + \frac{\partial e_i^+}{\partial e_j}\right) \tag{7}$$

The cost function for platform position (symbol Jp) is calculated by:

$$J_p = \vec{C}_p \cdot \vec{C}_p = (P(\vec{e})(\vec{e} - \vec{e}^c)) \cdot (P(\vec{e})(\vec{e} - \vec{e}^c)) \tag{8}$$

wherein $\vec{C}_p$ is a cost vector that is the result of multiplying the position weight function P with the predicted position $\vec{e}$, with $\vec{e}$ given by:

$$\vec{e} = e_i(x\ y\ z\ \phi\ \theta\ \psi)_{predicted}^T \tag{9}$$

The position weight function P is chosen to be a fully diagonal matrix. In this way, a cost is assigned to usage of workspace for each degree of freedom separately. This is advantageous because it allows tuning of the algorithm.

$$P = \begin{bmatrix} P_x(e_x) & & & & & \\ & P_y(e_y) & & & 0 & \\ & & P_z(e_z) & & & \\ & & & P_\phi(e_\phi) & & \\ & 0 & & & P_\theta(e_\theta) & \\ & & & & & P_\psi(e_\psi) \end{bmatrix} \tag{10}$$

The cost function for platform velocity (symbol Jv) is given by:

$$J_v = \vec{C}_v \cdot \vec{C}_v = (V(\vec{e})\dot{\vec{e}}) \cdot (V(\vec{e})\dot{\vec{e}}) \tag{11}$$

wherein $\vec{C}_v$ is the velocity cost vector that is the result of multiplying the velocity weight function V with the predicted platform velocity $\dot{\vec{e}}$ that is given by:

$$\dot{\vec{e}} = \dot{e}_i(\dot{x}\ \dot{y}\ \dot{z}\ \dot{\phi}\ \dot{\theta}\ \dot{\psi})_{predicted}^T \tag{12}$$

The velocity weight function is chosen to be a fully diagonal matrix. In this way, a cost is assigned to platform velocity for each degree of freedom separately. This is advantageous because it allows tuning of the algorithm.

$$V = \begin{bmatrix} V_x(e_x) & & & & & \\ & V_y(e_y) & & & 0 & \\ & & V_z(e_z) & & & \\ & & & V_\phi(e_\phi) & & \\ & 0 & & & V_\theta(e_\theta) & \\ & & & & & V_\psi(e_\psi) \end{bmatrix} \tag{13}$$

For motion cueing applications, the platform acceleration must closely match the acceleration set point of the motion cueing algorithm. Any deviation of the demanded platform acceleration is penalized with a cost factor. The cost function for platform acceleration is suitably given by:

$$J_a = \vec{C}_a \cdot \vec{C}_a = (A(\vec{e})\vec{a}_{WO}) \cdot (A(\vec{e})\vec{a}_{WO}) \tag{14}$$

wherein $\vec{C}_a$ is the acceleration cost vector that is the result of multiplying the velocity weight function A with the predicted acceleration $\ddot{\vec{e}}$ which is given by:

$$\ddot{\vec{e}} = \ddot{e}_i(\ddot{x}\ \ddot{y}\ \ddot{z}\ \ddot{\phi}\ \ddot{\theta}\ \ddot{\psi})_{predicted}^T \tag{15}$$

In this cost equation, A is a weight function which is chosen to be a fully diagonal matrix. In this way, a cost is assigned to deviation from demanded platform acceleration for each degree of freedom separately. The weight function is preferably independent of the position in the workspace.

$$A = \begin{bmatrix} A_x & & & & & \\ & A_y & & & 0 & \\ & & A_z & & & \\ & & & A_\phi & & \\ & 0 & & & A_\theta & \\ & & & & & A_\psi \end{bmatrix} \tag{16}$$

The partial derivatives of the position, velocity, and acceleration cost with washout acceleration can be worked out by straight forward differentiation. This leads to partial derivatives of predicted platform position, velocity and acceleration with washout acceleration. These derivatives are non-zero when a time horizon of $\Delta t$ is considered:

$$i = j \quad \frac{\partial e_i}{\partial a_j} = \Delta \frac{t^2}{2} \quad \frac{\partial \dot{e}_i}{\partial a_j} = \Delta t \quad \frac{\partial \ddot{e}_i}{\partial a_j} = 1 \tag{17}$$

$$i \neq j \quad \frac{\partial e_i}{\partial a_j} = 0 \quad \frac{\partial \dot{e}_i}{\partial a_j} = 0 \quad \frac{\partial \ddot{e}_i}{\partial a_j} = 0$$

The differentiation of the position, velocity and acceleration cost function also leads to SDE workspace acceleration derivatives which are computed from the SDE workspace position derivatives using equation 4.

The disclosure is also directed to a computer-readable recording medium that stores a computer program for use as a washout controller according to the present disclosure. Thus the computer program has a washout adaptation as output which is calculated using a model predictive control algorithm. The computer readable recording medium is suitably used as part of a controller of a motion-system as described above.

The invention claimed is:

1. A movement simulator, comprising:
   a base;
   a platform movable relative to said base;
   a plurality of actuators each having a controllably variable length, each of the actuators being coupled with said base and carrying said platform, wherein the dimensions of the base, platform and the variable lengths of the actuators determine a workspace having boundaries defining a size of the workspace within which the platform can move; and
   a controller operable to provide a motion cueing algorithm having a demanded platform state as output and a washout controller having a washout adaptation as output, which washout controller keeps the platform within the workspace by adapting the demanded platform state to a commanded platform state using the washout adaptation, wherein the commanded platform state controls, via a kinematic transformation, the lengths of the actuators, wherein the washout adaptation is calculated using a model predictive control algorithm comprising a cost-minimizing control strategy for position, velocity and washout acceleration of the platform, resulting in an adaptive second-order washout filter that is controlled by the size of the workspace and the platform position relative to the boundaries of the workspace, wherein the model predictive control algorithm continuously uses the demanded platform state and a current washout adaptation as inputs to compute a predicted platform state at $t+\Delta t$, and subsequently the algorithm quantifies the first and second order gradient of the costs J, wherein a new value for an optimal washout adaptation is obtained which results in minimal total costs, and wherein the washout adaptation is used to continuously modify the demanded platform state to a commanded platform state for a next computational step $t+dt$, wherein $dt$ is smaller than $\Delta t$.

2. A movement simulator according to claim 1, wherein a predicted workspace is calculated by performing a single degree of freedom (DOF) excursion analysis for the predicted platform state, and wherein the first and second order gradient of the costs J are calculated using weight functions which use a predicted workspace as input.

3. A movement simulator according to claim 2, wherein the optimal washout adaptation is the integration of washout acceleration which is calculated by the following equation:

$$\dot{\vec{a}}_{wo} \approx \frac{\Delta \vec{a}_{wo}}{\Delta t} = \frac{K}{\Delta t}\left(\frac{\partial^2 J}{\partial \vec{a}_{wo}^2}\right)^{-1} \frac{\partial J}{\partial \vec{a}_{wo}}$$

wherein $\dot{\vec{a}}_{wo}$ is the optimum rate of change of the washout acceleration, $\vec{a}_{wo}$ is washout acceleration and J is the total costs and a summation of Jp, Jv and Ja, wherein Jp is position cost, Jv is velocity cost and Ja is acceleration cost and K is a constant.

4. A movement simulator according to claim 3, wherein K is −1.

5. A movement-simulator according to claim 3, wherein Jp is the result of multiplying a predicted position relative to a workspace center with a position weight function which uses a position relative to the workspace center and a position relative to a positive and negative workspace boundary as inputs, wherein Jv is the result of multiplying a predicted velocity with a velocity weight function which uses the position relative to the workspace center and the position relative to the positive and negative workspace boundary as inputs, and wherein Ja is the result of multiplying the predicted washout acceleration with an acceleration weight function.

6. A movement simulator according to claim 2, wherein for the single DOF excursion analysis, an iterative method is used where the platform is moved stepwise along a free degree of freedom until a position is found in which at least of the actuators is either fully extended or fully retracted using forward kinematic analysis.

7. A movement simulator according to claim 2, wherein the single DOF excursion analysis makes use of two persistent estimators for each degree of freedom, wherein at each cycle of the algorithm, each estimator copies the value of the remaining fixed degrees of freedom from the current predicted position at time $t+\Delta t$, and wherein a forward kinematics analysis is then used to adjust the free degree of freedom such that the estimator is positioned accurately on the workspace boundary.

8. A movement simulator according to claim 7, wherein single DOF excursion workspace acceleration derivatives are computed from the single DOF excursion workspace position derivatives, and wherein computation of each single DOF excursion workspace position derivative proceeds from a linear analysis given by of equation:

$$Jc\Delta e_i + Jc\Delta e_j = \vec{0}$$

which expresses how much excursion $\Delta e_i$, in a direction of the single DOF excursion workspace free DOF having index i, is required to get back on the workspace extreme when a position perturbation of $\Delta e_j$ is applied, wherein Jc is the Jacobian matrix for the considered single DOF excursion workspace extreme position and j identifies the DOF of the position perturbation.

9. A movement simulator according to claim 8, wherein the workspace has mathematically smoothed off edges at places where a limiting actuator changes index.

10. A movement simulator according to claim 7 wherein the single DOF excursion workspace position derivatives are computed using equation:

$$i = j \Rightarrow \frac{\partial e_i^+}{\partial e_j} = \frac{\partial e_i^-}{\partial e_j} = 0$$

$$i \neq j \Rightarrow \frac{\partial e_i^+}{\partial e_j} = \frac{-\sum_{k=1}^{6} W_k \frac{Jc(k,j)}{Jc(k,i)}}{\sum_{k=1}^{6} W_k}$$

$$\frac{\partial e_i^-}{\partial e_j} = \frac{-\sum_{k=1}^{6} W_k \frac{Jc(k,j)}{Jc(k,i)}}{\sum_{k=1}^{6} W_k}$$

wherein $W_k$ is an edge blending function which is a function of available free travel of the k− th actuator to its critical excursion limit, and wherein edge blending is cancelled when $W_k=1$ for critical actuators and $W_k=0$ for non-critical actuators, and Jc is the Jacobian matrix for the considered single DOF excursion workspace extreme position.

11. A method of operating a movement simulator comprising a base, a platform movable relative to said base, a plurality of actuators each having a controllably variable length, said actuators being coupled with said base and carrying said platform, and wherein the dimensions of the base, platform and the variable lengths of the actuators determine a workspace having boundaries defining a size of the workspace within which the platform can move, wherein a motion cueing algorithm provides a demanded platform state as output, wherein a washout controller keeps the platform within the workspace by adapting the demanded platform state to a commanded platform state using a washout adaptation, which washout adaptation is calculated using a model predictive control algorithm adaptation, wherein the lengths of the actuators are controlled by the commanded platform state via a kinematic transformation, wherein the model predictive algorithm comprises a cost-minimizing control strategy for position, velocity and washout acceleration of the platform, resulting in an adaptive second-order washout filter that is controlled by the size of the workspace and the platform position relative to the boundaries of the workspace, wherein the model predictive control algorithm continuously uses the demanded platform state and current washout adaptation as inputs to compute a predicted platform state at t+Δt, and subsequently the algorithm quantifies the first and second order gradient of the costs J, wherein a new value for an optimal washout adaptation is obtained which results in minimal total costs, and wherein the washout adaptation is used to continuously modify the demanded platform state to a commanded platform state for a next computational step t+dt, wherein dt is smaller than Δt.

12. A method according to claim 11, wherein a predicted workspace is calculated by performing a single DOF excursion analysis for the predicted platform state, and wherein the first and second order gradient of the costs J are calculated using weight functions which use the predicted workspace as input.

13. A method according to claim 12, wherein the optimal washout adaptation is the integration of washout acceleration which is calculated by the following equation:

$$\dot{\vec{a}}_{wo} \approx \frac{\Delta \vec{a}_{wo}}{\Delta t} = \frac{K}{\Delta t}\left(\frac{\partial^2 J}{\partial \vec{a}_{wo}^2}\right)^{-1}\frac{\partial J}{\partial \vec{a}_{wo}}$$

wherein $\dot{\vec{a}}_{wo}$ is the optimum rate of change of the washout acceleration, $\vec{a}_{wo}$ is washout acceleration and J is the total costs and a summation of Jp, Jv and Ja, wherein Jp is position cost, Jv is velocity cost and Ja is acceleration cost and K is a constant.

14. A method according to claim 13, wherein K is −1.

15. A method according to any claim 13, wherein Jp is the result of multiplying a predicted position relative to a workspace center with a position weight function which uses a position relative to the workspace center and a position relative to a positive and negative workspace boundary as inputs, wherein Jv is the result of multiplying a predicted velocity with a velocity weight function which uses the position relative to the workspace center and the position relative to the positive and negative workspace boundary as inputs, and wherein Ja is the result of multiplying the predicted washout acceleration with an acceleration weight function.

16. A computer-readable recording medium that stores a computer program for use as a washout controller for a movement simulator having a platform movable within a workspace having boundaries defining a workplace size, the washout controller having a washout adaptation as output which is calculated using a model predictive control algorithm comprising a cost-minimizing control strategy for position, velocity and washout acceleration of the platform, resulting in an adaptive second-order washout filter that is controlled by the size of the workspace and the platform position relative to the boundaries of the workspace, and wherein the model predictive control algorithm continuously uses a demanded platform state and a current washout adaptation as inputs to compute a predicted platform state at t+Δt, and subsequently the algorithm quantifies first and second order gradients of the costs J, wherein a new value for an optimal washout adaptation is obtained which results in minimal total costs, and wherein the washout adaptation is used to continuously modify the demanded platform state to a commanded platform state for a next computational step t+dt, wherein dt is smaller than Δt.

17. A computer-readable recording medium according to claim 16, wherein a predicted workspace is calculated by performing a single DOF excursion analysis for the predicted platform state, and wherein the first and second order gradients of the costs J are calculated using weight functions which use the predicted workspace as input.

18. A computer-readable recording medium according to claim 17, wherein the optimal washout adaptation is the integration of washout acceleration which is calculated by the following equation:

$$\dot{\vec{a}}_{wo} \approx \frac{\Delta \vec{a}_{wo}}{\Delta t} = \frac{K}{\Delta t}\left(\frac{\partial^2 J}{\partial \vec{a}_{wo}^2}\right)^{-1}\frac{\partial J}{\partial \vec{a}_{wo}}$$

wherein $\dot{\vec{a}}_{wo}$ is the optimum rate of change of the washout acceleration, $\vec{a}_{wo}$ is washout acceleration, wherein J is the total costs and a summation of Jp, Jv and Ja, and wherein Jp is position cost, Jv is velocity cost and Ja is acceleration cost and K is a constant.

19. A computer-readable recording medium according to claim 18, wherein K is −1.

20. A computer-readable recording medium according to claim 18, wherein Jp is the result of multiplying a predicted position relative to a workspace center with a position weight function which uses a position relative to a workspace centre and a position relative to a positive and negative workspace boundary as input, wherein Jv is the result of multiplying a predicted velocity with a velocity weight function which uses the position relative to the workspace center and the position relative to the positive and negative workspace boundary as input, and wherein Ja is the result of multiplying a predicted washout acceleration with an acceleration weight function.

* * * * *